United States Patent
Ando et al.

(10) Patent No.: US 9,500,278 B2
(45) Date of Patent: Nov. 22, 2016

(54) HYDRAULIC CONTROL OPERATION AMOUNT GENERATION APPARATUS FOR AUTOMATIC TRANSMISSION AND CONTROL APPARATUS FOR AUTOMATIC TRANSMISSION

(71) Applicant: TOYOTA JIDOSHA KABUSHIKI KAISHA, Toyota-shi (JP)

(72) Inventors: Takayuki Ando, Miyoshi (JP); Masami Kondo, Niwa-gun (KH); Seiji Masunaga, Numazu (JP); Shogo Tsuge, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/743,036

(22) Filed: Jun. 18, 2015

(65) Prior Publication Data

US 2015/0369362 A1    Dec. 24, 2015

(30) Foreign Application Priority Data

Jun. 18, 2014  (JP) ................. 2014-125495

(51) Int. Cl.
- *G06F 17/00* (2006.01)
- *F16H 61/686* (2006.01)
- *F16H 61/06* (2006.01)

(52) U.S. Cl.
CPC ....... *F16H 61/686* (2013.01); *F16H 2061/062* (2013.01); *F16H 2306/32* (2013.01)

(58) Field of Classification Search
None
See application file for complete search history.

(56) References Cited

U.S. PATENT DOCUMENTS

| | | | | |
|---|---|---|---|---|
| 5,941,358 A * | 8/1999 | Hosseini | ................ | F16H 59/68 192/3.58 |
| 6,640,950 B2 * | 11/2003 | Harvey | ................ | F16D 25/12 192/109 F |
| 7,608,013 B2 * | 10/2009 | Chen | ................ | F16H 61/0437 477/132 |
| 7,686,738 B2 * | 3/2010 | Nohara | ................ | F16H 61/061 477/109 |
| 7,909,733 B2 * | 3/2011 | Imediegwu | ......... | F15B 13/0433 477/143 |
| 8,062,174 B2 * | 11/2011 | Sah | ........ | B60K 6/445 477/15 |
| 8,483,919 B2 * | 7/2013 | Byerly | ................ | F16H 61/0437 701/60 |
| 8,615,349 B2 * | 12/2013 | Neelakantan | ......... | F16D 48/066 477/166 |
| 8,652,003 B2 * | 2/2014 | Hase | ........ | F16H 61/061 477/174 |
| 2001/0003322 A1 | 6/2001 | Kon et al. | | |
| 2005/0222735 A1 | 10/2005 | Usuki et al. | | |
| 2006/0184304 A1 | 8/2006 | Katou et al. | | |
| 2007/0232445 A1 | 10/2007 | Yamamoto et al. | | |
| 2012/0115680 A1 | 5/2012 | Hase et al. | | |
| 2014/0309898 A1 | 10/2014 | Kitazawa et al. | | |

FOREIGN PATENT DOCUMENTS

| | | |
|---|---|---|
| JP | 2001-041317 A | 2/2001 |
| JP | 2001-165290 | 6/2001 |
| JP | 2001-349420 A | 12/2001 |
| JP | 2005-291267 A | 10/2005 |
| JP | 2006-219084 A | 8/2006 |
| JP | 2007-263338 A | 10/2007 |
| JP | 2012-102810 | 5/2012 |
| JP | 2013-155760 A | 8/2013 |
| WO | WO 2014/020685 A1 | 2/2014 |

* cited by examiner

*Primary Examiner* — Dirk Wright (74) *Attorney, Agent, or Firm* — Oblon, McClelland, Maier & Neustadt, L.L.P.

(57) ABSTRACT

With a hydraulic control operation amount generation apparatus for an automatic transmission and a control apparatus for an automatic transmission, a control operation amount at which any desired target packing control execution time can be realized is generated on a hydraulic model by determining formulae of the 2n−2 constraint conditions corresponding to the n hydraulic control phases relating to the packing control of the engagement devices.

7 Claims, 7 Drawing Sheets

|     | CL1 | CL2 | BK1 | BK2 | BK3 | F |
|-----|-----|-----|-----|-----|-----|---|
| P   |     |     |     |     |     |   |
| R   |     |     |     | ○   | ○   |   |
| N   |     |     |     |     |     |   |
| 1st | ○   |     |     |     |     | ○ |
| 2nd | ○   |     | ○   |     |     |   |
| 3rd | ○   |     |     |     | ○   |   |
| 4th | ○   | ○   |     |     |     |   |
| 5th |     | ○   |     |     | ○   |   |
| 6th |     | ○   | ○   |     |     |   |

HYDRAULIC CONTROL OPERATION AMOUNT GENERATION APPARATUS FOR AUTOMATIC TRANSMISSION AND CONTROL APPARATUS FOR AUTOMATIC TRANSMISSION

INCORPORATION BY REFERENCE

The disclosure of Japanese Patent Application No. 2014-125495, filed on Jun. 18, 2014 including the specification, drawings and abstract, is incorporated herein by reference in its entirety.

BACKGROUND OF THE INVENTION

1. Field of the Invention

The invention relates to a hydraulic control operation amount generation apparatus for an automatic transmission and a control apparatus for an automatic transmission, the automatic transmission having a plurality of engagement devices that are controlled by adjusting a hydraulic pressure in a working oil chamber.

2. Description of Related Art

In a conventional automatic transmission of this type, a gear ratio is switched by switching the respective engagement devices between an engaged condition and a disengaged condition. A control apparatus for this type of automatic transmission performs packing control to set the engagement devices in a standby condition (a so-called packed condition) immediately before the engaged condition by adjusting the hydraulic pressure in the working oil chamber. Japanese Patent Application Publication No. 2012-102810 (JP 2012-102810 A) and Japanese Patent Application Publication No. 2001-165290 (JP 2001-165290 A) disclose this packing control. According to a technique described in JP 2001-165290 A, when the packing control is performed, a target time (a preparation completion time) and a pack pressure (a preparatory pressure) of the packing control are retrieved from a map on the basis of an input shaft rotation speed of an engagement device and a temperature of working oil (automatic transmission fluid (ATF)), the preparation completion time is corrected on the basis of a remaining amount of working oil in the engagement device, and the preparatory pressure is supplied over the corrected preparation completion time.

SUMMARY OF THE INVENTION

Incidentally, in the technique described in JP 2012-102810 A, a packing response is increased by outputting a high instructed hydraulic pressure and filling a working oil chamber (a hydraulic servo) with working oil rapidly (fast fill control). Further, feedback control is performed to improve a control performance of the packing control. Here, different types of packing control corresponding to different types of shift control are required. For example, highly responsive packing control having a shortened packing control target time is preferably implemented in order to perform a fast shift.

The invention therefore provides a hydraulic control operation amount generation apparatus for an automatic transmission and a control apparatus for an automatic transmission with which a type of packing control can be varied appropriately.

According to an aspect of the invention, a hydraulic control operation amount generation apparatus for an automatic transmission includes a plurality of engagement devices, a hydraulic control circuit, a transmission ECU, and a control operation amount generation ECU. The engagement devices include a piston that operates in response to a pack pressure in a working oil chamber. The hydraulic control circuit is configured to adjust the pack pressure. The transmission ECU is configured to shift a gear position of the automatic transmission to a target gear position by engaging or disengaging the respective engagement devices in accordance with the target gear position. The transmission ECU is configured to perform packing control on the basis of a hydraulic model, the packing control being control for setting the engagement devices, which are to be subjected to engagement control, in a standby condition immediately before an engaged condition. The control operation amount generation ECU is configured to calculate a hydraulic model having n (n≥2) hydraulic control phases of the packing control. Each hydraulic control phase is constituted by a combination of a hydraulic pressure command value and an output time of the hydraulic pressure command value. The calculated hydraulic model is a model on which a hydraulic pressure command value of the pack pressure and an output time of the hydraulic pressure command value at which to realize a target execution time of the packing control and a piston stroke end pressure for maintaining the standby condition are determined as control operation amounts. The control operation amount generation ECU is configured to generate 2n−1 control operation amounts. The 2n−1 control operation amounts is control operation amounts obtained by excluding an output time of one hydraulic pressure control phase from the 2n control operation amounts of the n hydraulic control phases. The control operation amount generation ECU is configured to calculate 2n−2 constraint conditions relating to a degree of packing progress. The control operation amount generation ECU is configured to generate the 2n−1 control operation amounts on the basis of the target execution time, the piston stroke end pressure, and the 2n−2 constraint conditions.

In the aspect described above, the constraint conditions may be constituted by the degree of packing progress in n−1 locations and a time-differentiated value of the degree of packing progress in the n−1 locations.

In the aspect described above, the constraint conditions may be constituted by the degree of packing progress in 2n−2 locations.

In the aspect described above, the degree of packing progress may be a value no smaller than 0 and no larger than 1. The control operation amount generation ECU may be configured to calculate the degree of packing progress on the basis of at least one of a stroke amount of the piston, an amount of working oil supplied to the working oil chamber, and the pack pressure.

In the aspect described above, each of the hydraulic control phases may be constituted by a step waveform of the hydraulic pressure command value, a sweep waveform of the hydraulic pressure command value, or a combination of the step waveform and the sweep waveform.

In the aspect described above, the hydraulic pressure command value of the sweep waveform may include information indicating a hydraulic pressure gradient within the output time of the hydraulic pressure command value.

According to another aspect of the invention, a control apparatus for an automatic transmission includes a plurality of engagement device, a hydraulic control circuit, and at least one ECU. The plurality of engagement devices include a piston that operates in response to a pack pressure in a working oil chamber. The hydraulic control circuit is configured to adjust the pack pressure. The ECU is configured to shift a gear position of the automatic transmission to a target gear position by engaging or disengaging the respective engagement devices in accordance with the target gear position. The ECU is configured to perform packing control on the basis of a hydraulic model. The packing control is control for setting the engagement devices, which are to be subjected to engagement control, in a standby condition immediately before an engaged condition. The ECU is configured to calculate a hydraulic model having n (n≥2) hydraulic control phases of the packing control. Each hydraulic control phase is constituted by a combination of a hydraulic pressure command value and an output time of the hydraulic pressure command value. The calculated hydraulic model is a hydraulic model on which a hydraulic pressure command value of the pack pressure and an output time thereof at which to realize a target execution time and a piston stroke end pressure for maintaining the standby condition are determined as control operation amounts. The ECU is configured to calculate 2n−2 constraint conditions relating to a degree of packing progress. The ECU is configured to generate 2n−1 control operation amounts on the basis of the target execution time, the piston stroke end pressure, and the 2n−2 constraint conditions. The 2n−1 control operation amounts are control operation amounts obtained by excluding an output time of one hydraulic pressure control phase from the 2n control operation amounts in the n hydraulic control phases.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of a hydraulic control operation amount generation apparatus for an automatic transmission and a control apparatus for an automatic transmission according to the invention will be described in detail below on the basis of the drawings. Note that the invention is not limited to this embodiment.

An embodiment of the hydraulic control operation amount generation apparatus for an automatic transmission and the control apparatus for an automatic transmission according to the invention will now be described on the basis of FIG. 1 to FIG. 7.

Figure 1:
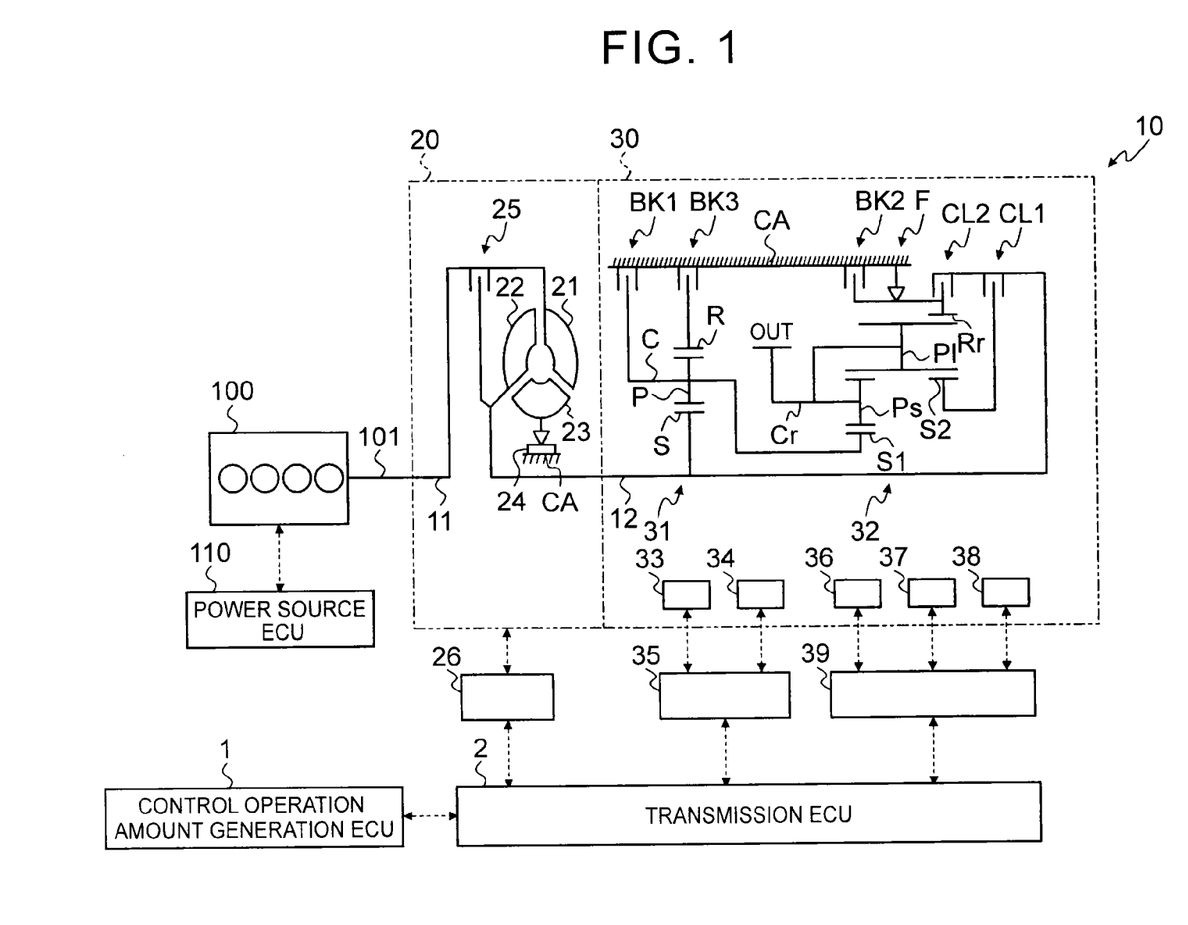
FIG. 1 is a view showing an example of an automatic transmission to which a hydraulic control operation amount generation apparatus for an automatic transmission and a control apparatus for an automatic transmission according to the invention are applied.

The hydraulic control operation amount generation apparatus for an automatic transmission includes an electronic control unit (ECU) (referred to hereafter as a "control operation amount generation ECU") 1 shown in FIG. 1, and generates a control operation amount used during hydraulic control of an engagement device of the automatic transmission. The control operation amount generation ECU 1 includes a constraint condition calculation unit, a control operation amount generation unit, and a hydraulic model calculation unit, to be described below. The hydraulic control operation amount generation apparatus may be used when creating a control program for the automatic transmission (in other words, when developing the automatic transmission or a vehicle), or may be installed in the vehicle and used to generate an appropriate control operation amount in accordance with types of shift control performed on the automatic transmission during travel. In the latter application example, the hydraulic control operation amount generation apparatus is used as a calculation processing function of the control apparatus for an automatic transmission to be described below.

Further, the control apparatus for an automatic transmission includes an ECU (referred to hereafter as a "transmission ECU") 2, and performs shift control for shifting the automatic transmission to a target gear position (a target gear ratio) and shift control for shifting the automatic transmission to a neutral condition. The transmission ECU 2 includes a shift control unit, a clutch control unit, a target time calculation unit, and a packing control unit, to be described below. The control apparatus for an automatic transmission also includes the control operation amount generation ECU 1. Note that in the control apparatus for an automatic transmission, various calculation processing functions of the control operation amount generation ECU 1 may be allocated to the transmission ECU 2.

The automatic transmission to which the hydraulic control operation amount generation apparatus and the control apparatus are applied will now be described. The automatic transmission includes a plurality of engagement devices that are controlled by adjusting a hydraulic pressure in a working oil chamber, a hydraulic control circuit that engages or disengages the respective engagement devices, and a planetary device having rotary elements that are connected to engagement elements of the engagement devices. The shift control unit of the transmission ECU 2 shifts a gear position of the automatic transmission to the target gear position by engaging or disengaging the respective engagement devices in accordance with the target gear position.

A specific example of a forward six-speed automatic transmission 10 shown in FIG. 1 will now be described. As shown in FIG. 1, the automatic transmission 10 includes a torque converter 20 and a transmission main body 30.

The torque converter 20 includes a pump impeller 21, a turbine runner 22, and a stator 23. The torque converter 20 transmits output torque from a power source 100 to the transmission main body 30. An input shaft 11 of the automatic transmission 10 is connected to the pump impeller 21 to be capable of rotating integrally therewith. An output shaft 101 of the power source 100 is coupled to the input shaft 11. An intermediate shaft 12 is connected to the turbine runner 22 to be capable of rotating integrally therewith. The turbine runner 22 is connected to the transmission main body 30 via the intermediate shaft 12. The stator 23 is connected to a casing CA via a one-way clutch 24. The torque converter 20 is further provided with a lock-up clutch 25. The lock-up clutch 25 causes an actuator 26 serving as the hydraulic control circuit to implement an engagement operation or a disengagement operation between a first engagement portion and a second engagement portion.

Note that the power source 100 is an engine (an engine such as an internal combustion engine or an external combustion engine) or a motor (an electric motor or the like). Operations (starting control, stopping control, output control, and so on) of the power source 100 are controlled by an ECU (referred to hereafter as a "power source ECU") 110.

First and second planetary devices 31, 32, first and second clutches CL1, CL2 and first to third brakes BK1, BK2, BK3 serving as the engagement devices, and a one-way clutch F are provided in the casing CA of the transmission main body 30.

The first planetary device 31 is a single pinion type planetary gear mechanism having, as a plurality of rotary elements that are capable of differential rotation, a sun gear S, a ring gear R, a plurality of pinion gears P, and a carrier C. The second planetary device 32 is a Ravigneaux type planetary gear mechanism having, as a plurality of rotary elements that are capable of differential rotation, a first sun gear S1, a second sun gear S2, a ring gear Rr, a plurality of long pinion gears P1 meshed to the second sun gear S2 and the ring gear Rr, a plurality of short pinion gears Ps meshed to the first sun gear S1 and the long pinion gears P1, and a carrier Cr that carries the respective long pinion gears P1 and the respective short pinion gears Ps. In the transmission main body 30, the carrier C of the first planetary device 31 and the first sun gear S1 of the second planetary device 32 are connected to each other to be capable of rotating integrally. Further, a rotary shaft of the carrier Cr of the second planetary device 32 serves as an output shaft of the automatic transmission 10, and is connected to a drive wheel via a differential device and so on, not shown in the drawings.

The first clutch CL1 includes a first engagement portion that is capable of rotating integrally with the second sun gear S2 of the second planetary device 32, and a second engagement portion that is capable of rotating integrally with the intermediate shaft 12 and the sun gear S of the first planetary device 31. The second clutch CL2 includes a first engagement portion that is capable of rotating integrally with the ring gear Rr of the second planetary device 32, and a second engagement portion that is capable of rotating integrally with the intermediate shaft 12 and the sun gear S of the first planetary device 31.

The first and second clutches CL1, CL2 are hydraulically-driven frictional engagement devices (friction clutches). The first and second clutches CL1, CL2 respectively include clutch packs 33, 34. The clutch pack 33 (34) engages the first engagement portion and the second engagement portion of the first clutch CL1 (the second clutch CL2) by pushing a piston when working oil is supplied to a working oil chamber such that a pack pressure thereof increases. Further, the clutch pack 33 (34) disengages the first engagement portion and the second engagement portion of the first clutch CL1 (the second clutch CL2) by pushing the piston back when the working oil is discharged from the working oil chamber such that the pack pressure thereof decreases.

The pack pressure of the clutch packs 33, 34 is adjusted by an actuator 35 serving as the hydraulic control circuit. The actuator 35 includes a first solenoid valve for the first clutch CL1 and a second solenoid valve for the second clutch CL2, which operate in response to commands from the clutch control unit or the packing control unit of the transmission ECU 2. The actuator 35 adjusts the pack pressure of the clutch pack 33 (34) by adjusting a valve opening of the first solenoid valve (the second solenoid valve). For example, when the first clutch CL1 (the second clutch CL2) is to be engaged, the actuator 35 can perform packing control, in which the first clutch CL1 (the second clutch CL2) is set in a standby condition (a so-called packed condition) immediately before an engaged condition, by increasing the pack pressure of the clutch pack 33 (34) in response to a command from the packing control unit. The first clutch CL1 (the second clutch CL2) is then controlled to the engaged condition by further increasing the pack pressure from the packed condition using the clutch control unit. As a result, shock (so-called shift shock) accompanying engagement can be suppressed during an engagement operation. The actuator 35 is also capable of disengaging the first clutch CL1 (the second clutch CL2) by closing the first solenoid valve (the second solenoid valve) so as to reduce the pack pressure of the clutch pack 33 (34).

The first brake BK1 includes a first engagement portion that is capable of rotating integrally with the carrier C of the first planetary device 31, and a second engagement portion that is fixed to the casing CA. The second brake BK2 includes a first engagement portion that is capable of rotating integrally with the ring gear Rr of the second planetary device 32, and a second engagement portion that is fixed to the casing CA. The third brake BK3 includes a first engagement portion that is capable of rotating integrally with the ring gear R of the first planetary device 31, and a second engagement portion that is fixed to the casing CA.

The first to third brakes BK1, BK2, BK3 are hydraulically-driven frictional engagement devices (friction brakes). The first to third brakes BK1, BK2, BK3 respectively include brake packs 36, 37, 38. The brake pack 36 (37, 38) engages the first engagement portion and the second engagement portion of the first brake BK1 (the second brake BK2, the third brake BK3) by pushing a piston when the working oil is supplied to a working oil chamber such that the pack pressure thereof increases. Further, the brake pack 36 (37, 38) disengages the first engagement portion and the second engagement portion of the first brake BK1 (the second brake BK2, the third brake BK3) by pushing the piston back when the working oil is discharged from the working oil chamber such that the pack pressure thereof decreases.

The pack pressure of the brake pack 36 (37, 38) is adjusted by an actuator 39 serving as the hydraulic control circuit. The actuator 39 includes a first solenoid valve for the first brake BK1, a second solenoid valve for the second brake BK2, and a third solenoid valve for the third brake BK3, which operate in response to commands from the brake control unit or the packing control unit of the transmission ECU 2. The actuator 39 adjusts the pack pressure of the brake pack 36 (37, 38) by adjusting a valve opening of the first solenoid valve (the second solenoid valve, the third solenoid valve). For example, when the first brake BK1 (the second brake BK2, the third brake BK3) is to be engaged, the actuator 39 can perform packing control, in which the first brake BK1 (the second brake BK2, the third brake BK3) is set in the packed condition, by increasing the pack pressure of the brake pack 36 (37, 38) in response to a command from the packing control unit. The first brake BK1 (the second brake BK2, the third brake BK3) is then controlled to the engaged condition by further increasing the pack pressure from the packed condition using the brake control unit. As a result, the shock (the shift shock) accompanying engagement can be suppressed during the engagement operation. The actuator 39 is also capable of disengaging the first brake BK1 (the second brake BK2, the third brake BK3) by closing the first solenoid valve (the second solenoid valve, the third solenoid valve) so as to reduce the pack pressure of the brake pack 36 (37, 38).

The one-way clutch F includes a first engagement portion that is capable of rotating integrally with the ring gear Rr of the second planetary device 32, the first engagement portion of the second clutch CL2, and the first engagement portion of the second brake BK2, and a second engagement portion that is fixed to the casing CA. The one-way clutch F prohibits the ring gear Rr and so on from rotating in one direction.

Figure 2:
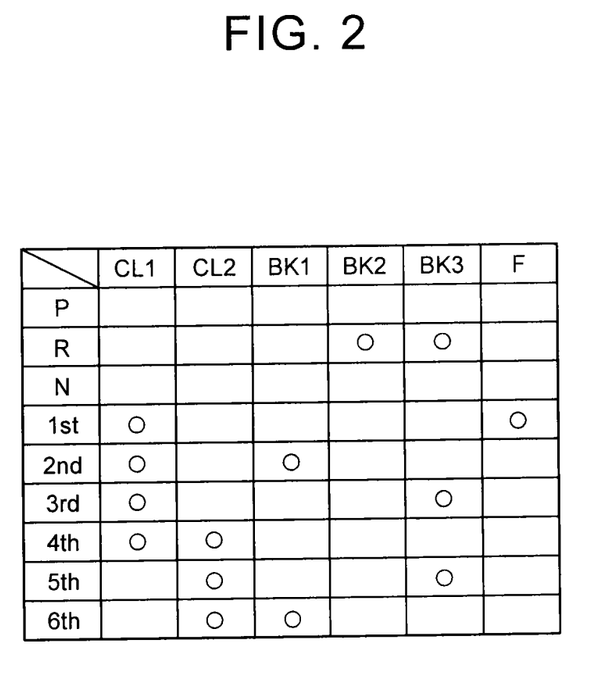
FIG. 2 is a view showing an engagement operation table of the transmission.

FIG. 2 is an engagement operation table showing respective shift ranges of the first and second clutches CL1, CL2, the first to third brakes BK1, BK2, BK3, and the one-way clutch F. On the engagement operation table, circles indicate the engaged condition and blank sections indicate the disengaged condition. Note that "P" in the drawing denotes a parking range. "R" denotes a reverse range. "N" denotes a neutral range. "$1^{st}$", "$2^{nd}$", "$3^{rd}$", "$4^{th}$", "$5^{th}$", and "$6^{th}$" respectively denote first speed to sixth speed gear positions of a forward range D.

The packing control implemented on the engagement devices (the first and second clutches CL1, CL2 and the first to third brakes BK1, BK2, BK3) will now be described in detail.

The packing control unit of the transmission ECU 2 implements the packing control on an engagement device to be subjected to engagement control.

During the packing control, a target execution time (referred to hereafter as a "packing target time") TE of the packing control is set. The packing target time TE is a target time from a point at which the packing control unit starts to apply a command value (referred to hereafter as a "hydraulic pressure command value") p of an instructed hydraulic pressure of the pack pressure relating to the packing control to the actuator 35 (39) to a point at which an actual pack pressure (referred to hereafter as the "actual pack pressure") Pr reaches a piston stroke end pressure PE. The piston stroke end pressure PE is a pack pressure required to maintain the packed condition.

Figure 3:
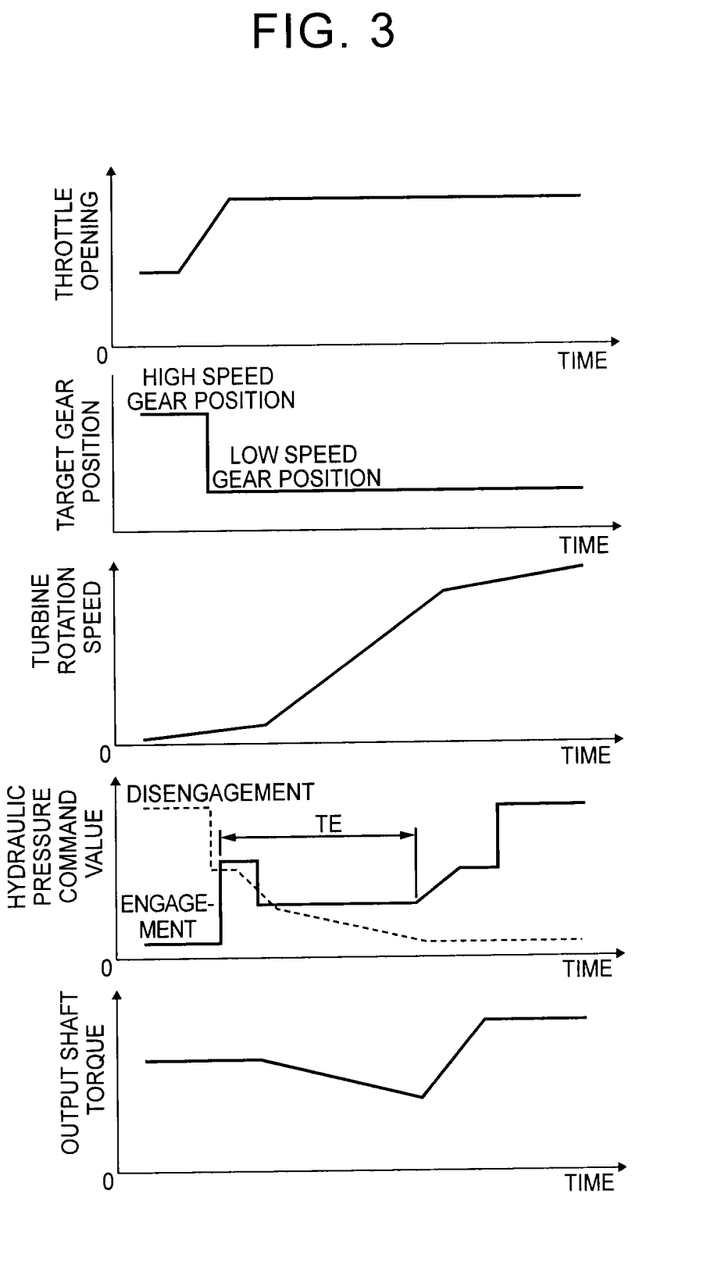
FIG. 3 is a time chart of packing control performed during a power-on downshift.
Figure 4:
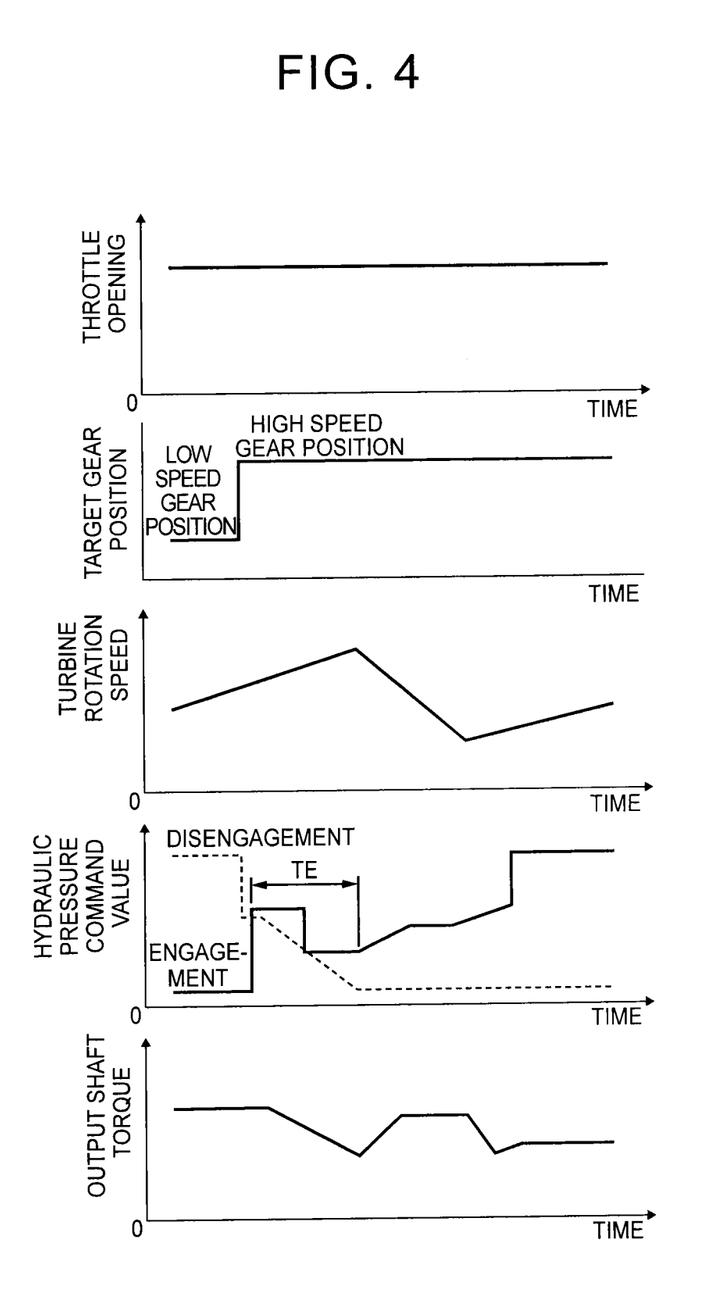
FIG. 4 is a time chart of packing control performed during a manual upshift.

The target time calculation unit of the transmission ECU 2 calculates the packing target time TE. The packing target time TE is calculated in accordance with types of shift control, for example. Packing target times TE corresponding to types of shift control are prepared in advance in the form of a map. In the case of a multiple gear shift, for example, in which a gear shift is performed over two or more consecutive gear positions, a time required for each gear shift must be shortened, and therefore torque capacities of the engagement devices that are subjected to engagement control in the respective gear positions must be increased rapidly. In this case, therefore, the target time calculation unit reduces the packing target time TE in comparison with a case of a gear shift performed over a single gear position (a normal gear shift), for example. In terms of more specific examples, when a power-on downshift is performed, the packing target time TE is lengthened (FIG. 3) in comparison with a normal downshift, for example, and when a manual upshift is performed, the packing target time TE is shortened (FIG. 4) in comparison with a normal upshift, for example. A power-on downshift is a downshift performed as a throttle opening increases in response to a kick-down operation performed by a driver on an accelerator pedal. A normal downshift is a downshift accompanying an accelerator OFF operation by the driver and a vehicle speed reduction, for example. A manual upshift is an upshift performed when the driver performs an upshift operation on a shift operation unit (a shift lever or the like). A normal upshift is an upshift performed as the throttle opening increases in response to a gentler accelerator ON operation than the kick-down operation, performed by the driver. Note that FIGS. 3 and 4 are time charts showing the throttle opening, the target gear position, a turbine rotation speed, the hydraulic pressure command value of the pack pressure, and an output shaft torque of the automatic transmission 10 during the packing control. The packing target time TE is preferably set such that a response that corresponds to the type of shift control is realized, and shift shock is suppressed.

Further, when the packing target time TE is calculated in a case where a plurality of engagement devices are subjected to engagement control in the target gear position, variation in an engagement response among the respective engagement devices is preferably taken into account. For example, the packing target times TE of the plurality of engagement devices subjected to engagement control may be determined within a range of the variation, or set at times that are advanced or retarded by a predetermined time relative to values determined within the range of the variation. More specifically, in a case where a plurality of engagement devices are subjected to engagement control in the target gear position, the packing target time TE is set at a steadily shorter time as the engagement response of the engagement device decreases. In so doing, a response delay in an engagement device having a low response during engagement from the packed condition can be suppressed. On the other hand, an engagement device having a high response is unlikely to be packed more quickly than imagined, and therefore shift shock can be suppressed. When shifting to the target gear position with the automatic transmission 10, therefore, shift shock can be suppressed while also suppressing a delay in the shift response.

The packing control unit implements the packing control on the basis of a hydraulic model relating to the hydraulic pressure command value p of the pack pressure. The hydraulic model defines at least a control operation amount for realizing the packing target time TE and the piston stroke end pressure PE. The control operation amount refers to the hydraulic pressure command value p of the pack pressure and an output time tp of the hydraulic pressure command value p. In other words, the hydraulic model defines the manner in which the hydraulic pressure command value p is output during packing control corresponding to the type of shift control.

The control operation amount generation ECU 1 for generating the control operation amount on the hydraulic model will be described below. As described above, the hydraulic control operation amount generation apparatus may be used to generate a plurality of control operation amounts on hydraulic models corresponding to types of shift control in advance at a development stage of the automatic transmission 10 or a vehicle, or may be used to generate an appropriate control operation amount on the hydraulic model corresponding to the type of shift control performed on the automatic transmission 10 during travel.

The hydraulic model is calculated by the hydraulic model calculation unit of the control operation amount generation ECU 1 (the transmission ECU 2). Further, the control operation amount on the hydraulic model is generated by the control operation amount generation unit of the control operation amount generation ECU 1 (the transmission ECU 2).

More specifically, the hydraulic model includes n (n≥2) hydraulic control phases m (m=1, 2, . . . , n) of the packing control, which are constituted by combinations of the hydraulic pressure command value p (m) of the pack pressure and the output time tp (m) of the hydraulic pressure command value p (m). Accordingly, 2n control operation amounts constituted by n hydraulic pressure command values p (m) and n output times tp (m) exist in the n hydraulic control phases m. Note, however, that within the 2n control operation amounts, the output time tp (mx) of one hydraulic control phase mx can be calculated from the output time tp (m) of the remaining hydraulic control phase m and the packing target time TE. Therefore, a hydraulic model of packing control having n hydraulic control phases m can be constructed by determining 2n−1 control operation amounts, excluding the output time tp (mx) of this one hydraulic control phase mx. Accordingly, the control operation amount generation unit generates 2n−1 control operation amounts by excluding the output time tp (mx) of the one hydraulic control phase mx from the 2n control operation amounts of the n hydraulic control phases m. Here, for example, the output time tp (n) of the hydraulic control phase n that is implemented last during the packing control is excluded.

The hydraulic control phase m is constituted by a step waveform of the hydraulic pressure command value p (m), a sweep waveform of the hydraulic pressure command value p (m), or a combination of the step waveform and the sweep waveform.

Figure 5:
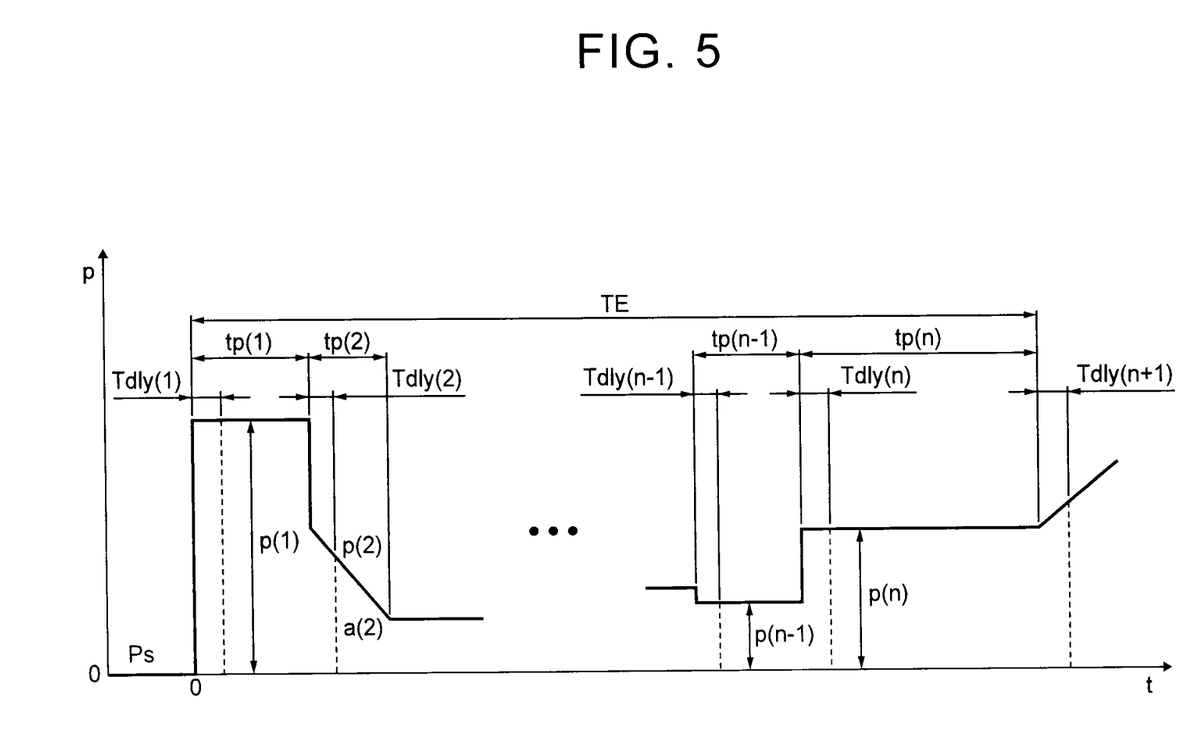
FIG. 5 is a view showing an example of a hydraulic model.

FIG. 5, for example, shows a hydraulic model on which the n hydraulic control phases m of the packing control are provided as combinations of a step waveform and a sweep waveform. On this hydraulic model, "Tdly (m)" is a response delay time of the actual pack pressure Pr (m, t) relative to the hydraulic pressure command value p (m) in each hydraulic control phase m. Note that "Tdly (n)" is the response delay time of a hydraulic control phase immediately after completion of the packing control. "Ps" is the actual pack pressure prior to the start of the packing control. Prior to the start of the packing control, the engagement device is in the disengaged condition, and therefore both the actual pack pressure Ps and the hydraulic pressure command value p are zero. Further, the hydraulic pressure command value p (m) in the sweep waveform-shaped hydraulic control phase m includes information a (m) indicating a hydraulic pressure gradient that varies over time t within the output time tp (m).

On this hydraulic model, when the time t is at "$0 \leq t \leq Tdly (1)$", an actual pack pressure Pr (1, t) corresponding to a hydraulic pressure command value p (1) is not supplied due to the response delay, and as a result, the actual pack pressure Ps (=0) corresponding to the hydraulic pressure command value p prior to the start of the packing control is supplied. Note that here, a start time of the packing control is set as the origin (t=0). Further, the actual pack pressure Pr (m, t) of each hydraulic control phase m is expressed by Equation 1, shown below. Note, however, that the actual pack pressure Pr (1, t) in a first hydraulic control phase 1 of the packing control {=Fin (1)+F1 (t, p (1))} is supplied when the time t is at "$Tdly (1) < t \leq tp (1) + Tdly (2)$". From a second hydraulic control phase m onward (m≥2), on the other hand, the actual pack pressure Pr (m, t) is supplied when the time t is as shown below in Equation 2.

$$Pr(m, t) = Fin(m) + Fm(t, p(m)) \quad (1)$$

$$\sum_{m=2}^{n} tp(m-1) + Tdly(m) < t \leq \sum_{m=2}^{n} tp(m) + Tdly(m+1) \quad (2)$$

Here, "Fin (m)" is an initial value of the actual pack pressure Pr (m, t) in the hydraulic control phase m. The initial value Fin (m) is a final value of an actual pack pressure Pr (m−1, t) in an immediately preceding hydraulic control phase m−1. For example, the initial value Fin (1) of the first hydraulic control phase 1 is the actual pack pressure Pr (=Ps) at "$0 \leq t \leq Tdly (1)$".

Further, "Fm (t, p (m))" is a function of the actual pack pressure Pr (m, t) corresponding to the hydraulic pressure control value p (m) at the time t of the hydraulic control phase m. The function Fm (t, p (m)) is preferably prepared separately for a case in which the hydraulic control phase m is shaped as a step waveform and a case in which the hydraulic control phase m is shaped as a sweep waveform. When the function Fm (t, p (m)) is set as a first order lag system, the function Fm (t, p (m)) is as shown below in Equation 3. "Tcst (m)" is a time constant in the hydraulic control phase m.

$$Fm(t,p(m))=p(m)(1-\exp(-(t-Tdly(m))/Tcst(m))) \quad (3)$$

In this embodiment, 2n−2 constraint conditions are calculated in relation to the actual pack pressure Pr (m, t) over a predetermined time t taking into consideration the response delay in the actual pack pressure Pr (m, t) relative to the hydraulic pressure command value p (m). The constraint conditions are calculated by the constraint condition calculation unit of the control operation amount generation ECU 1 (the transmission ECU 2) using Equation 1, shown above. To calculate the constraint conditions, a determination is preferably made in advance as to whether to form the respective hydraulic control phases m as step waveforms or sweep waveforms. For this purpose, a plurality of rough hydraulic model types (combinations of the number of hydraulic control phases m and the waveform shape) are preferably prepared in advance in the control operation amount generation ECU 1. For example, the hydraulic model calculation unit reads a hydraulic model that serves as a base from a storage device or the like, not shown in the drawings, of the control operation amount generation ECU 1 on the basis of the shift control type and so on. Setting of the constraint conditions and so on may then be performed while generating the control operation amount on the basis of the hydraulic model that serves as a base.

The constraint condition calculation unit calculates an actual pack pressure Pr (m, tx (m)) over a predetermined time tx (m) within the hydraulic control phase m as one of the constraint conditions (Equation 4). "β (m)" is a degree of packing progress in the corresponding hydraulic control phase m. The degree of packing progress is a degree to which a pack clearance is packed relative to the packed condition. In other words, the constraint condition calculation unit may be said to calculate the degree of packing progress β (m) over the predetermined time tx (m) within the hydraulic control phase m as one of the constraint conditions.

$$Pr(m,tx(m))=Fin(m)+Fm(tx(m),p(m))=\beta(m) \cdot PE \quad (4)$$

Here, the degree of packing progress β (m) is a value expressing the degree of packing progress, and takes a value from 0 to 1. The degree of packing progress β (m) is calculated on the basis of the actual pack pressure Pr (m, t (m)). Note, however, that the degree of packing progress β (m) may also be calculated from a stroke amount of the piston and an amount of working oil supplied to the working oil chamber. Hence, the degree of packing progress β (m) may be calculated on the basis of at least one of the stroke amount of the piston, the amount of working oil supplied to the working oil chamber, and the actual pack pressure Pr (m, t (m)).

The constraint condition calculation unit calculates a time-differentiated value d (m) of the actual pack pressure Pr (m, tx (m)) determined as the constraint condition as another constraint condition (Equation 5). "d (m)" denotes a time-differentiated value of the degree of packing progress β (m). Hence, the constraint condition calculation unit may be said to calculate a time-differentiated value d (m) of the degree of packing progress β (m) over the predetermined time tx (m) within the hydraulic control phase m as one of the constraint conditions.

$$Pr'(m, tx(m)) = Fm'(tx(m), p(m)) = d(m) \quad (5)$$

The constraint condition calculation unit may calculate 2n−2 constraint conditions (the degree of packing progress β (m) and the time-differentiated value d (m) of the degree of packing progress β (m)) in relation to the degree of packing progress β (m) from the n hydraulic control phases m. During these calculations, the constraint condition calculation unit sets a time at which the actual pack pressure Pr (m, t) corresponding to a final output value of the hydraulic pressure command value p (m) in each hydraulic control phase m, for example, as the predetermined time tx (m). As a specific example, in the first hydraulic control phase 1 of the packing control, "tp (1)+Tdly (2)" is set as the predetermined time tx (1) during which to constrain the actual pack pressure Pr (1, tx (1)) in the hydraulic control phase 1.

The constraint condition calculation unit determines two constraint conditions for each hydraulic control phase m from n−1 hydraulic control phases m, for example. More specifically, the constraint condition calculation unit determines the degree of packing progress β (m) and the time-differentiated value d (m) of the degree of packing progress β (m) in a single hydraulic control phase m, whereupon the constraint condition calculation unit implements calculation of the degree of packing progress β (m) and the time-differentiated value d (m) of the degree of packing progress β (m) on each of the n−1 hydraulic control phases m. In other words, the constraint condition calculation unit calculates the degree of packing progress β (m) in n−1 locations and the time-differentiated value d (m) of the degree of packing progress β (m) in those n−1 locations as the constraint conditions. The hydraulic control phase m that is excluded from the n−1 phases may be determined as the hydraulic control phase mx having the aforesaid excluded output time tp (mx), for example.

In this example, a constraint condition relating to the degree of packing progress β (m) of the actual pack pressure Pr (m, tx (m)) over the predetermined time tx (m) is determined. Instead, however, the constraint condition calculation unit may set a predetermined time of a predetermined actual pack pressure within the hydraulic control phase m as the constraint condition. Note, however, that formulae for calculating the constraint condition in the latter case are more complicated than those of the former case, leading to an increase in a calculation processing load. Therefore, the degree of packing progress β (m) of the actual pack pressure Pr (m, tx (m)) over the predetermined time tx (m), as described in the former case, is preferably determined as the constraint condition.

The control operation amount generation unit generates the aforesaid 2n−1 control operation amounts (the hydraulic pressure command value p (m) of the pack pressure and the output time tp (m) of the hydraulic pressure command value p (m)) on the basis of the 2n−2 constraint conditions, the packing target time TE, and the piston stroke end pressure PE.

For example, the hydraulic pressure command value p (m) and the output time tp (m) of a certain hydraulic control phase m may be set on the basis of the constraint conditions of the corresponding hydraulic control phase m. The reason for this is that the hydraulic control phase m is not related to another hydraulic control phase m+1, for example, and therefore the formulae relating to the hydraulic control phase m can be simplified.

Furthermore, depending on the specifications of the engagement devices, for example, an upper limit value and a lower limit value may be set in relation to the hydraulic pressure command value p (m) and the output time tp (m). In this case, the control operation amount generation unit sets the upper limit value as a final control operation amount when the generated control operation amount exceeds the upper limit value, and sets the lower limit value as the final control operation amount when the generated control operation amount is lower than the lower limit value.

The control operation amount generation unit calculates the output time tp (mx) excluded from the preceding calculation processing on the basis of a sum of the output times tp (m) of the 2n−1 control operation amounts and the packing target time TE.

Figure 6:
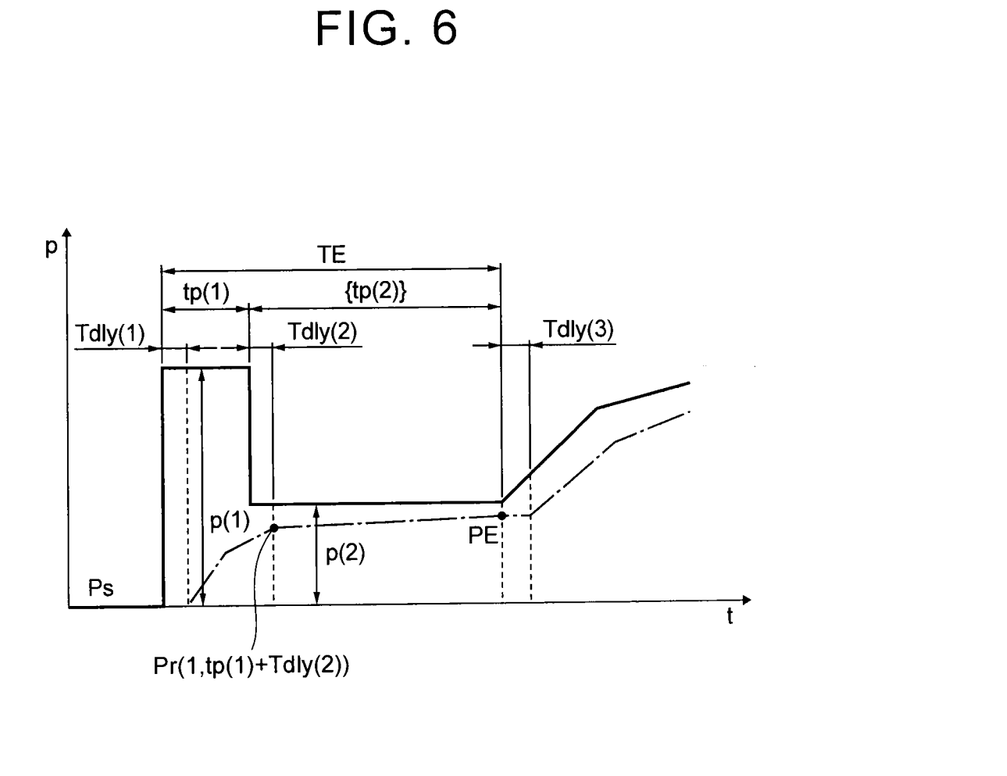
FIG. 6 is a view showing an example of a hydraulic model.

FIG. 6, for example, shows a hydraulic model having two step waveform-shaped hydraulic control phases m.

As described above, the actual pack pressure Pr (1, t) corresponding to the hydraulic pressure command value p (1) of the hydraulic control phase 1 reaches "Pr (1, t)=Fin (1)+F1 (t, p (1))" when the time t is "Tdly (1)<t≤tp (1)+Tdly (2)". The function F1 (t, p (1)) of the corresponding first order lag system is obtained by inserting "m=1" into Equation 3. Further, an actual pack pressure Pr (2, t) corresponding to a hydraulic pressure command value p (2) of a hydraulic control phase 2 reaches "Pr (2, t)=Fin (2)+F2 (t, p (2))" at a time t obtained by inserting "m=2" into Equation 2 (i.e. "m=2" is inserted into Equation 1). A function F2 (t, p (1)) of the corresponding first order lag system is obtained by inserting "m=2" into Equation 3. Note that "Pr (2, tp (1)+tp (2))" takes an identical value to the piston stroke end pressure PE.

The constraint condition calculation unit sets a degree of packing progress β (1), which is obtained from Equation 4 after inserting "m=1", and a time-differentiated value d (1) of the degree of packing progress β (1), which is obtained from Equation 5 after inserting "m=1", as the constraint conditions of the hydraulic control phase 1, for example. The control operation amount generation unit then generates the hydraulic pressure command value p (1) and the output time tp (1) of the hydraulic control phase 1 and the hydraulic pressure command value p (2) of the hydraulic control phase 2 on the basis of the two constraint conditions, the packing target time TE, and the piston stroke end pressure PE.

A plurality of control operation amounts obtained from the hydraulic model generated as described herein are prepared in accordance with types of shift control at the development stage of the automatic transmission 10 and so on, and applied to a control program of the automatic transmission 10.

Further, in a case where the hydraulic control operation amount generation apparatus is installed in a vehicle, the control operation amount is generated on the hydraulic model as described above after learning the type of shift control to be performed on the automatic transmission 10, whereupon the packing control is implemented on the basis of the hydraulic model. Control performed at this time will now be described on the basis of a flowchart shown in FIG. 7.

Figure 7:
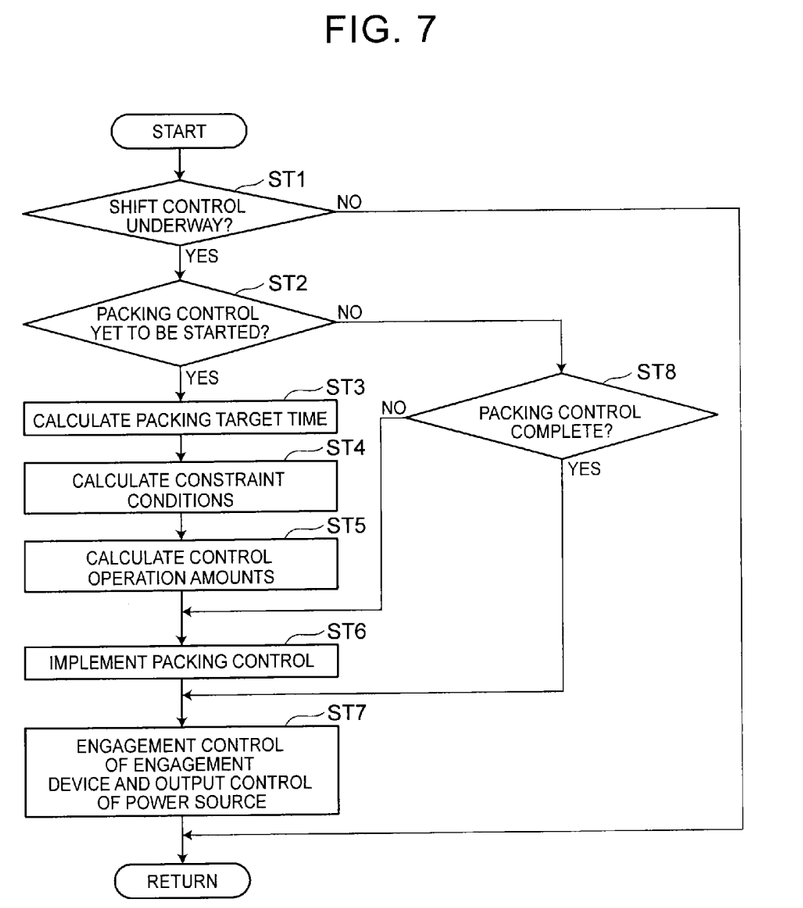
FIG. 7 is an example of a flowchart relating to hydraulic model generation.

The target time calculation unit determines whether or not shift control to the target gear position is underway (step ST1). When a gear shift is not underway, the calculation processing is temporarily terminated.

When the shift control is underway, the target time calculation unit determines whether or not packing control on an engagement device to be subjected newly to engagement control in the target gear position is yet to be started (step ST2).

When the packing control is yet to be started, the target time calculation unit calculates the packing target time TE of the packing control to be implemented on the subject engagement device (step ST3). The constraint condition calculation unit then calculates the constraint conditions (step ST4). Next, the control operation amount generation unit generates the 2n−1 control operation amounts in relation to the packing control to be implemented on the engagement device (step ST5).

The packing control unit then performs the packing control on the engagement device using the hydraulic model that includes the generated control operation amounts (step ST6).

Next, in the vehicle, the clutch control unit or the brake control unit engages the engagement device, and the output control unit of the power source ECU 110 controls the output torque of the power source 110 (step ST7).

Note that when it is determined in step ST2 that the packing control is not yet to be started, the packing control unit determines whether or not the packing control is complete (step ST8). When the packing control is still underway, the control advances to step ST6, where the packing control is continued. When the packing control is complete, on the other hand, the control advances to step ST7.

With the hydraulic control operation amount generation apparatus for an automatic transmission and the control apparatus for an automatic transmission according to this embodiment, as described above, a control operation amount at which any desired packing target time TE can be realized can be generated on a hydraulic model by determining formulae of 2n−2 constraint conditions corresponding to n hydraulic control phases relating to packing control of an engagement device (the first and second clutches CL1, CL2 and the first to third brakes BK1, BK2, BK3). In the hydraulic control operation amount generation apparatus for an automatic transmission and the control apparatus for an automatic transmission, a control operation amount at which a packing target time TE corresponding to a type of shift control can be realized, for example, can be generated on a hydraulic model. With the hydraulic control operation amount generation apparatus for an automatic transmission and the control apparatus for an automatic transmission, therefore, shift shock can be suppressed while securing a response corresponding to the type of shift control during packing control. For example, with the hydraulic control operation amount generation apparatus for an automatic transmission and the control apparatus for an automatic transmission, torque capacities of engagement devices that are subjected to engagement control in respective gear positions during a multiple gear shift can be increased quickly using the control operation amount generated on the hydraulic model. As a result, the gear position can be switched quickly during the multiple gear shift such that a driving force can be output to a drive wheel without interruption.

Here, as regards the constraint condition, instead of using both the degree of packing progress $\beta$ (m) and the time-differentiated value d (m) of the degree of packing progress $\beta$ (m), as described above, either one of the degree of packing progress $\beta$ (m) and the time-differentiated value d (m) of the degree of packing progress $\beta$ (m) may be used.

For example, when a hydraulic model having n hydraulic control phases m is selected as a base, an actual pack pressure Pr (m, t (k)) over a predetermined time t (k) in 2n−2 locations of the packing target time TE, or in other words a degree of packing progress $\beta$ (m, t (k)) in the 2n−2 locations, is set as the constraint condition (k=1, 2, . . . , 2n−2). Equation 6, shown below, expresses the actual pack pressure Pr (m, t (k)) and the degree of packing progress $\beta$ (m, t (k)).

$$Pr(m,t(k))=Fz(k)=\beta(m,t(k))\cdot PE \qquad (6)$$

"Fz (k)" is a function for determining an estimated value of the actual pack pressure Pr (m, t (k)). The hydraulic model used as a base includes two hydraulic control phases m, for example, and when the predetermined time t (1) exists within the output time tp (1) of the hydraulic control phase 1, a function Fz (1) when "k=1" is a function having the hydraulic pressure command value p (1) and the output time tp (1) of the hydraulic control phase 1, the predetermined time t (1), and the hydraulic pressure command value p (2) of the hydraulic control phase 2 as parameters, as shown below in Equation 7. Further, when the predetermined time t (2) exists within the output time tp (2) of the hydraulic control phase 2, a function Fz (2) when "k=2" is a function having the hydraulic pressure command value p (1) and the output time tp (1) of the hydraulic control phase 1, the predetermined time t (2), and the hydraulic pressure command value p (2) of the hydraulic control phase 2 as parameters, as shown below in Equation 8.

$$Fz(1)=Fz(tp(1),t(1),p(1),p(2)) \qquad (7)$$

$$Fz(2)=Fz(tp(1),t(2),p(1),p(2)) \qquad (8)$$

Likewise when the constraint condition is set in this manner, similar effects to those described above can be obtained with the hydraulic control operation amount generation apparatus for an automatic transmission and the control apparatus for an automatic transmission.

With the hydraulic control operation amount generation apparatus for an automatic transmission and the control apparatus for an automatic transmission according to the invention, a control operation amount at which any desired target packing control execution time can be realized can be generated on a hydraulic model by determining formulae of the 2n−2 constraint conditions corresponding to the n hydraulic control phases relating to the packing control of the engagement devices. In the hydraulic control operation amount generation apparatus for an automatic transmission and the control apparatus for an automatic transmission, a control operation amount at which a target execution time corresponding to a type of shift control can be realized, for example, can be generated on a hydraulic model. With the hydraulic control operation amount generation apparatus for an automatic transmission and the control apparatus for an automatic transmission, therefore, shift shock can be suppressed while securing a response corresponding to the type of shift control during packing control.

What is claimed is:

1. A hydraulic control operation amount generation apparatus for an automatic transmission, comprising:
   a plurality of engagement devices, the engagement devices including a piston that operates in response to a pack pressure in a working oil chamber;
   a hydraulic control circuit configured to adjust the pack pressure;
   a transmission ECU configured to
   shift a gear position of the automatic transmission to a target gear position by engaging or disengaging the respective engagement devices in accordance with the target gear position, and
   perform packing control on the basis of a hydraulic model, the packing control being control for setting the engagement devices, which are to be subjected to engagement control, in a standby condition immediately before an engaged condition; and
   a control operation amount generation ECU configured to
   calculate a hydraulic model having n hydraulic control phases of the packing control, the n being equal to or more than 2, each hydraulic control phase being constituted by a combination of a hydraulic pressure command value and an output time of the hydraulic pressure command value, and the calculated hydraulic model being a model on which a hydraulic pressure command value of the pack pressure and an output time of the hydraulic pressure command value at which to realize a target execution time of the packing control and a piston stroke end pressure for maintaining the standby condition are determined as control operation amounts,
   generate 2n−1 control operation amounts, the 2n−1 control operation amounts being control operation amounts obtained by excluding an output time of one hydraulic pressure control phase from the 2n control operation amounts of the n hydraulic control phases,
   calculate 2n−2 constraint conditions relating to a degree of packing progress by determining two constraint conditions for each hydraulic control phase from n−1 hydraulic control phases, and
   generate the 2n−1 control operation amounts on the basis of the target execution time, the piston stroke end pressure, and the 2n−2 constraint conditions.

2. The hydraulic control operation amount generation apparatus according to claim 1, wherein the constraint conditions are constituted by the degree of packing progress in n−1 locations and a time-differentiated value of the degree of packing progress in the n−1 locations.

3. The hydraulic control operation amount generation apparatus according to claim 1, wherein the constraint conditions are constituted by the degree of packing progress in 2n−2 locations.

4. The hydraulic control operation amount generation apparatus according to claim 2, wherein the degree of packing progress is a value no smaller than 0 and no larger than 1, and the control operation amount generation ECU is configured to calculate the degree of packing progress on the basis of at least one of a stroke amount of the piston, an amount of working oil supplied to the working oil chamber, or the pack pressure.

5. The hydraulic control operation amount generation apparatus according to claim 1, wherein each of the hydraulic control phases is constituted by a step waveform of the hydraulic pressure command value, a sweep waveform of the hydraulic pressure command value, or a combination of the step waveform and the sweep waveform.

6. The hydraulic control operation amount generation apparatus according to claim 1, wherein the hydraulic pressure command value of the sweep waveform includes information indicating a hydraulic pressure gradient within the output time of the hydraulic pressure command value.

7. A control apparatus for an automatic transmission, comprising:
   a plurality of engagement devices, the engagement devices including a piston that operates in response to a pack pressure in a working oil chamber;
   a hydraulic control circuit configured to adjust the pack pressure; and
   at least one ECU configured to
   (i) shift a gear position of the automatic transmission to a target gear position by engaging or disengaging the respective engagement devices in accordance with the target gear position,
   (ii) perform packing control on the basis of a hydraulic model, the packing control being control for setting the engagement devices, which are to be subjected to engagement control, in a standby condition immediately before an engaged condition,
   (iii) calculate a hydraulic model having n hydraulic control phases of the packing control, the n being equal to or more than 2, each hydraulic control phase being constituted by a combination of a hydraulic pressure command value and an output time of the hydraulic pressure command value, the calculated hydraulic model being a hydraulic model on which a hydraulic pressure command value of the pack pressure and an output time thereof at which to realize a target execution time and a piston stroke end pressure for maintaining the standby condition are determined as control operation amounts,
   (iv) generate 2n−1 control operation amounts by excluding an output time of one hydraulic pressure control phase from the 2n control operation amounts in the n hydraulic control phase; and
   (v) calculate 2n−2 constraint conditions relating to a degree of packing progress by determining two constraint conditions for each hydraulic control phase from n−1 hydraulic control phases,
   wherein the 2n−1 control operation amounts are generated on the basis of the target execution time, the piston stroke end pressure, and the 2n−2 constraint conditions.

* * * * *